US010846681B2

(12) United States Patent
Park et al.

(10) Patent No.: US 10,846,681 B2
(45) Date of Patent: Nov. 24, 2020

(54) SYSTEM AND METHOD FOR PROVIDING PAYMENT SERVICE

(71) Applicant: HAREX INFOTECH INC., Seoul (KR)

(72) Inventors: Kyung Yang Park, Seoul (KR); Moon Ho Yang, Gyeonggi-do (KR)

(73) Assignee: HAREX INFOTECH INC., Seoul (KR)

( * ) Notice: Subject to any disclaimer, the term of this patent is extended or adjusted under 35 U.S.C. 154(b) by 210 days.

(21) Appl. No.: 15/520,284

(22) PCT Filed: Oct. 20, 2015

(86) PCT No.: PCT/KR2015/011099
§ 371 (c)(1),
(2) Date: Apr. 19, 2017

(87) PCT Pub. No.: WO2016/064172
PCT Pub. Date: Apr. 28, 2016

(65) Prior Publication Data
US 2017/0323287 A1     Nov. 9, 2017

(30) Foreign Application Priority Data
Oct. 20, 2014    (KR) ........................ 10-2014-0141904

(51) Int. Cl.
*G06Q 20/32*       (2012.01)
*G06Q 20/40*       (2012.01)
(Continued)

(52) U.S. Cl.
CPC ......... *G06Q 20/327* (2013.01); *G06Q 20/204* (2013.01); *G06Q 20/34* (2013.01); *G06Q 20/40* (2013.01); *G06Q 20/4097* (2013.01)

(58) Field of Classification Search
CPC .... G06Q 20/327; G06Q 20/204; G06Q 20/34; G06Q 20/40; G06Q 20/4097
See application file for complete search history.

(56) References Cited

U.S. PATENT DOCUMENTS

| 8,244,631 B2 | 8/2012 | Ueno et al. |
| 2001/0051915 A1 | 12/2001 | Ueno et al. |

(Continued)

FOREIGN PATENT DOCUMENTS

| JP | 2001-216567 A | 8/2001 |
| JP | 2001-325435 A | 11/2001 |

(Continued)

OTHER PUBLICATIONS

Korea Patent Office, Office Action in counterpart Korean Patent Application No. 10-2014-0141904, dated May 31, 2016.

(Continued)

*Primary Examiner* — Florian M Zeender
*Assistant Examiner* — Joseph M Mutschler
(74) *Attorney, Agent, or Firm* — Sughrue Mion, PLLC (57) ABSTRACT

The present invention relates to a system and method for providing a payment service of a two-channel authentication method utilizing a card reader infrastructure and a portable user terminal. The system for providing a payment service according to an aspect of the present invention includes an affiliate POS terminal configured to receive MIN card information and generate and transmit a transaction approval request signal, and a server configured to receive the transaction approval request signal, transmit a transaction authentication request signal to a portable user terminal, and transmit approval request information to a financial institution server when transaction authentication is completed from an input signal of the portable user terminal.

9 Claims, 6 Drawing Sheets

(51) Int. Cl.
*G06Q 20/34* (2012.01)
*G06Q 20/20* (2012.01)

(56) References Cited

U.S. PATENT DOCUMENTS

| | | | |
|---|---|---|---|
| 2006/0231611 A1 | 10/2006 | Chakiris et al. | |
| 2006/0253389 A1* | 11/2006 | Hagale | G06Q 40/00 705/39 |
| 2008/0270301 A1 | 10/2008 | Jones et al. | |
| 2010/0223187 A1 | 9/2010 | Fujita et al. | |
| 2014/0052638 A1* | 2/2014 | Chung | G06Q 20/351 705/44 |
| 2015/0199658 A1 | 7/2015 | Fujita et al. | |

FOREIGN PATENT DOCUMENTS

| | | |
|---|---|---|
| JP | 2001-344545 A | 12/2001 |
| JP | 2002-334173 A | 11/2002 |
| JP | 2007-310889 A | 11/2007 |
| JP | 2009-129377 A | 6/2009 |
| JP | 2013-20496 A | 1/2013 |
| KR | 10-2001-0045072 A | 6/2001 |
| KR | 10-2004-0065432 A | 7/2004 |
| KR | 10-2004-0094249 A | 11/2004 |
| KR | 10-2007-0044832 A | 4/2007 |
| KR | 10-0908434 B1 | 7/2009 |
| KR | 10-2010-0122973 A | 11/2010 |
| KR | 20100122973 A * | 11/2010 |
| KR | 10-2014-0096016 A | 8/2014 |
| WO | 2007/018119 A1 | 2/2007 |
| WO | 2007/136939 A2 | 11/2007 |

OTHER PUBLICATIONS

International Searching Authority, International Search Report of PCT/KR2015/011099, dated Feb. 23, 2016. [PCT/ISA/210].
International Searching Authority, Written Opinion of PCT/KR2015/011099, dated Feb. 23, 2016. [PCT/ISA/237].
Japanese Patent Office; Communication dated May 2, 2018 in counterpart Japanese application No. 2017-521583.

* cited by examiner

SYSTEM AND METHOD FOR PROVIDING PAYMENT SERVICE

CROSS REFERENCE TO RELATED APPLICATIONS

This application is a National Stage of International Application No. PCT/KR2015/011099 filed Oct. 20, 2015, claiming priority based on Korean Patent Application No. 10-2014-0141904, filed Oct. 20, 2014, the contents of all of which are incorporated herein by reference in their entirety.

TECHNICAL FIELD

The present invention relates to a system and method for providing a payment service according to a two-channel authentication method that utilizes a card reader infrastructure and a portable user terminal.

BACKGROUND ART

A card payment service providing technique utilizing a card reader infrastructure according to a conventional technology employs a method in which a Point of Sales (POS) terminal of a card affiliate reads a credit card or debit card of a user and transmits a corresponding approval request to a card company or a financial institution.

However, according to the conventional technique, card information may be leaked from a terminal or server of a card affiliate, and also a card may be misused due to a leakage of card information caused by hacking a network between a card affiliate and a card company. Also, when a card company server is hacked, there is a great probability that card information of a user will be leaked.

In order to solve such a problem, a reverse payment method in which a payment is performed without using actual card information at an affiliate has been proposed.

In the reverse payment method according to a conventional technology, a payment is performed by an affiliate transferring payment information to a cell phone of a customer who wants to pay and a customer requesting payment approval from a financial institution or a payment service company through his or her cell phone, instead of a customer who wants to pay transferring card information to an affiliate.

The reverse payment method according to the conventional technology tends to be safe from hacking of a network between an affiliate terminal or an affiliate and a card company because card information is not directly transferred to the affiliate, and also tends to be safe from a threat of hacking against a cell phone because financial information for a real card is not stored in the cell phone. Also, since real financial information is not used, it is possible to prevent a card from being misused even when card information is leaked due to hacking of a financial company server.

A method of pushing or transferring payment request information from an affiliate terminal to a cell phone of a payer is classified into a method in which a cell phone number of a payer is entered through a terminal of a seller or transferred in the form of a bar code to transfer payment information to the cell phone number, and a method in which a payer reads payment information from an affiliate terminal in the form of NFC or QR code by using his or her cell phone.

However, a privacy-invasion issue may additionally arise when a payer gives his or her cell phone number to a clerk of an affiliate according to the conventional technology.

DETAILED DESCRIPTION OF THE INVENTION

Technical Problem

The present invention is intended to provide a payment service provision system and method for providing a payment service that enable a user to perform payment approval through his or her terminal by using an affiliate terminal (a card reader infrastructure) in order to solve the above-described problems of the conventional technique.

Technical Solution

According to an aspect of the present invention, a system for providing a payment service includes an affiliate POS terminal configured to receive MIN card information, generate a transaction approval request signal, and transmit the generated transaction approval request signal and a server configured to receive the transaction approval request signal, transmit a transaction authentication request signal to a portable user terminal, and transmit approval request information to a financial institution server when transaction authentication is completed from an input signal of the portable user terminal.

According to another aspect of the present invention, a method of providing a payment service includes receiving MIN card information of a user from an affiliate POS terminal and receiving a transaction approval request signal including the MIN card information and corresponding transaction information, which are performed by a service of a system for providing a payment service; transmitting a transaction authentication request signal corresponding to the received transaction approval request signal, and generating approval request information from a user input signal in response to the transaction authentication request signal and transmitting the generated approval request information.

Advantageous Effects of the Invention

The system and method for providing a payment service according to the present invention can prevent a card information leakage accident that occurs due to a network or server being hacked into by transmitting or receiving only MIN card information, which is portable user terminal number information or a personal identification card number, receiving card selection information and password information from the portable user terminal with respect to corresponding transaction information, and approving a transaction.

The system and method for providing a payment service according to the present invention can prevent an illegal use of a credit card by a third party by transmitting or receiving credit card information of a user and corresponding transaction information and performing corresponding transaction authentication.

Advantageous effects of the invention are not limited to the aforementioned effects, and other advantageous effects that are not described herein should be clearly understood by those skilled in the art from the following description.

MODE OF THE INVENTION

Advantages and features of the present invention and implementation methods thereof will be clarified through the following embodiments described with reference to the accompanying drawings. The present invention may, however, be embodied in different forms and is not to be construed as limited to the embodiments set forth herein. Rather, these embodiments are provided so that this disclosure is be thorough and complete and fully conveys the scope of the present invention to those skilled in the art. The terminology used herein is for the purpose of describing particular embodiments only and is not intended to be limiting of example embodiments. As used herein, the singular forms "a," "an," and "the" are intended to include the plural forms as well unless the context clearly indicates otherwise. It should be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, preferred embodiments of the present invention will be described in detail with reference to the accompanying drawings.

The present invention relates to a system and method for providing a payment service that use a 2-channel authentication method for a user to approve payment information through his or her mobile terminal without directly giving his or her phone number to an affiliate. An embodiment using MIN card information of a user (i.e., portable user terminal number information or a personal identification card number) will be described below.

Figure 1:
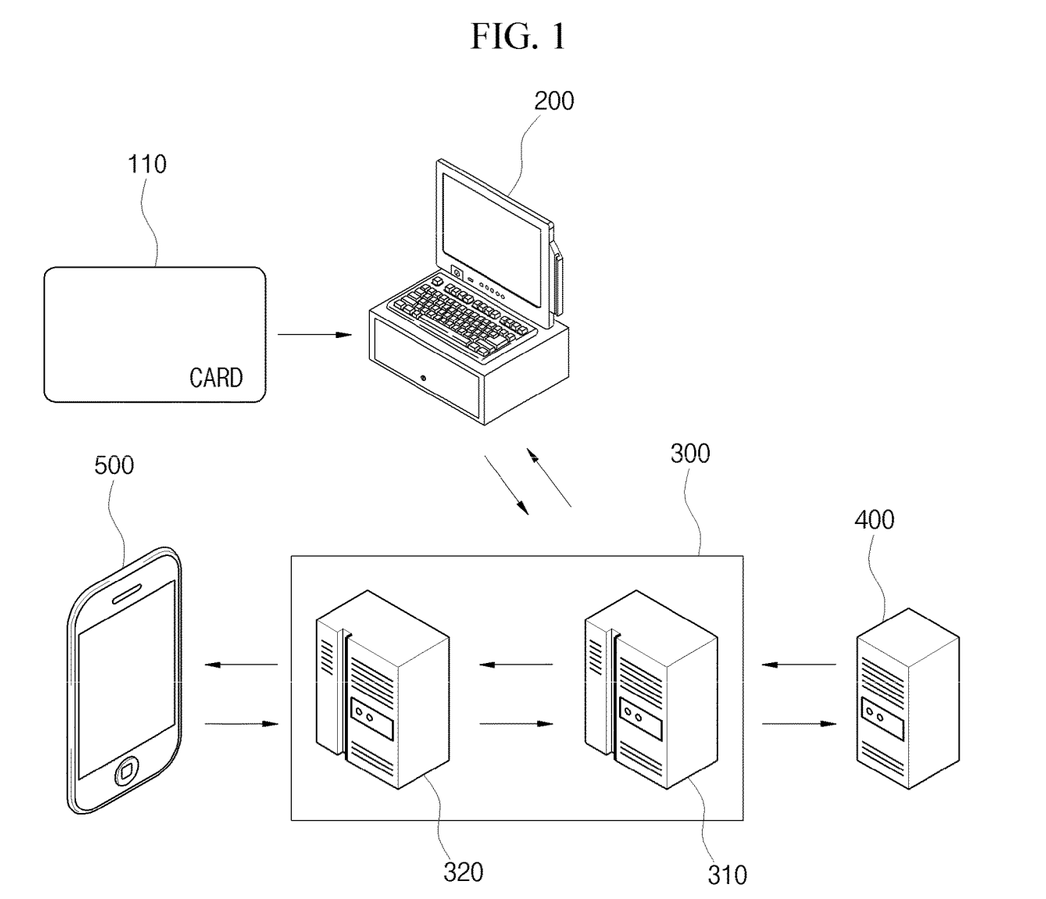
FIG. 1 is an example diagram showing a system for providing a payment service that uses a MIN card according to an embodiment of the present invention.

FIG. 1 is an example diagram showing a system for providing a payment service that uses a MIN card according to an embodiment of the present invention.

As shown in FIG. 1, the system for providing a payment service that uses a MIN card according to an embodiment of the present invention includes an affiliate POS terminal 200 configured to receive user card information, which is MIN card information, and transmit a transaction approval request signal and a server 300 configured to receive the transaction approval request signal, transmit a transaction authentication request signal to a portable user terminal 500, and transmit approval request information to a financial institution server 400 when transaction authentication is completed from an input signal of the portable user terminal 500.

As an example, a user card 110 is a MIN card and includes phone number information of the portable user terminal 500. The affiliate POS terminal 200 adds corresponding transaction information to a phone number of the portable user terminal 500 received from such a MIN card 110 to generate a transaction approval request signal, and transmits the transaction approval request signal to the server 300.

Figure 2:
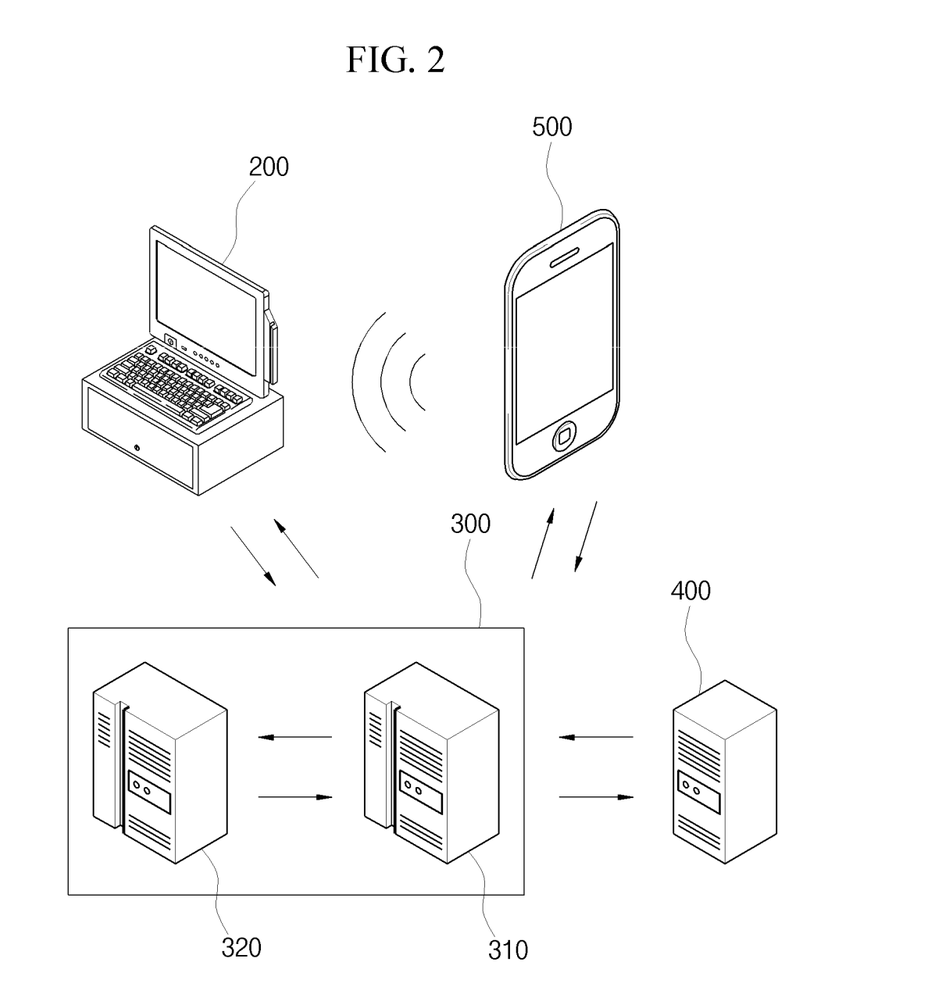
FIG. 2 is an example diagram showing a system for providing a payment service that uses a coil loop method according to an embodiment of the present invention.

FIG. 1 shows an example of using a real plastic card as the user card 110. As another example, as shown in FIG. 2, the affiliate POS terminal 200 may receive MIN card information stored in the portable user terminal 500 using a coil loop method.

That is, the portable user terminal 500 converts MIN card information that is prestored into a magnetic field and transmits the magnetic field, and a magnetic reading unit of the affiliate POS terminal 200 receives the MIN card information by receiving the magnetic field.

The MIN card information is portable user terminal number information or a personal identification card number. Typically, it is preferable that the MIN card information be a membership card number or an ID card number.

When a personal identification card number is transferred, a phone number of the portable user terminal is acquired by using information corresponding to the personal identification card number, which is prestored in the server 300 or other authentication servers.

The affiliate POS terminal 200 transmits the transaction approval request signal to the server 300 in addition to corresponding transaction information including price information, installment information, and affiliate information.

Also, the server 300 includes a value-added network (VAN) server 310 configured to receive the transaction approval request signal from the affiliate POS terminal 200 and request corresponding transaction authentication, and a mobile VAN server 320 configured to transmit a transaction authentication request signal including the corresponding transaction information to the portable user terminal 500 in response to the request for the transaction authentication of the VAN server 310.

That is, the mobile VAN server 320 receives the transaction authentication request signal from the VAN server 310, transmits the transaction authentication request signal to the portable user terminal 500, and receives a transaction confirmation password (PIN) entered through the portable user terminal 500 in response to the transaction authentication request signal.

The portable user terminal 500 confirms transaction authentication through a pop-up message corresponding to the received transaction authentication request signal, selects at least one payment instrument from among a credit card, a debit card, and a mobile phone for a small payment, and receives password information for the payment instrument. That is, when the transaction authentication request signal is received, the portable user terminal 500 performs authentication on corresponding transaction information by selecting a card to be used for a transaction corresponding to the transaction information from among a plurality of cards through a user input signal, and receiving a password for the selected card.

The server 300 according to an embodiment of the present invention generates approval request information by using a payment instrument and a password that are received from the portable user terminal 500, and transmits the approval request information to the financial institution server 400. Also, the server 300 transfers approval response information, which is received from the financial institution server 400 when the approval is completed, to the affiliate POS terminal 200.

The system for providing a payment service that uses a MIN card according to an embodiment of the present invention may receive card selection information and password information regarding corresponding transaction information from the portable user terminal 500 instead of transmitting or receiving real card information, and may perform a sequence of approving the transaction. Thus, it is possible to prevent the card information from being leaked due to network hacking or server hacking.

Also, while the affiliate POS terminal 200 transmits MIN card information that has been received to the VAN server 310, the MIN card information (a phone number of a portable user terminal) is not exposed to the affiliate POS terminal 200. Thus, it is possible to protect the privacy of users.

Figure 3:
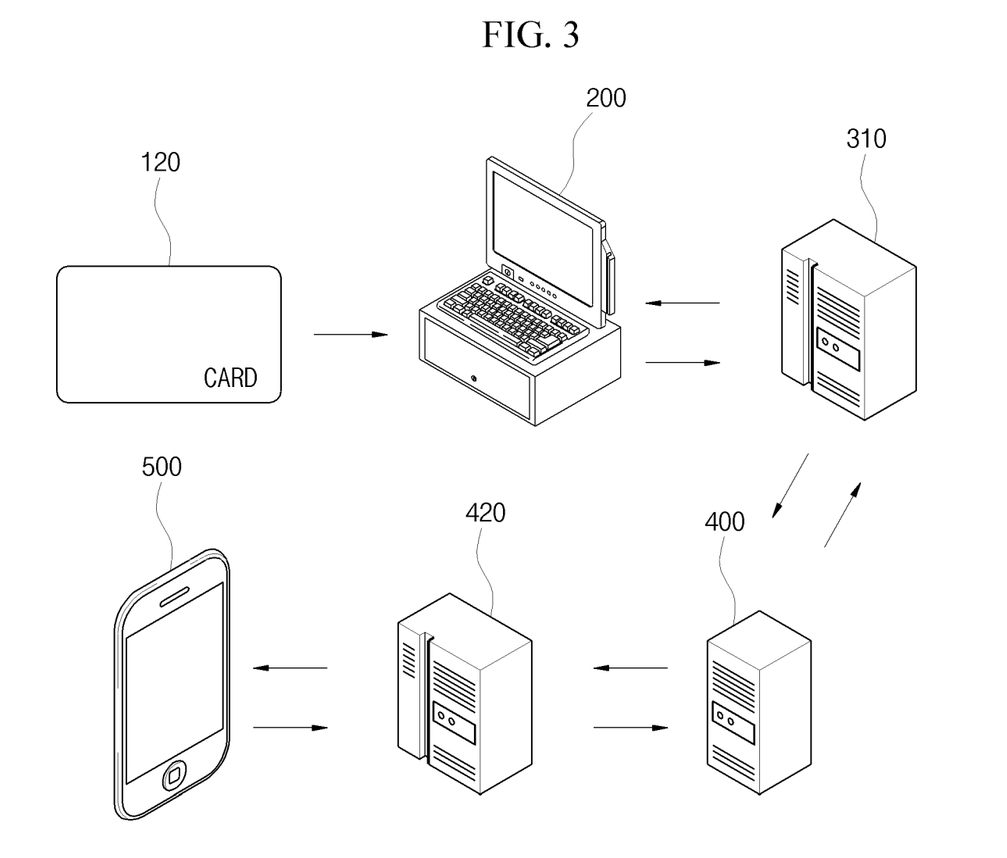
FIG. 3 is an example diagram showing a system for providing a payment service that uses a credit card according to an embodiment of the present invention.

FIG. 3 is an example diagram showing a system for providing a payment service that uses a credit card according to an embodiment of the present invention.

As shown in FIG. 3, a system for providing a payment service that uses a credit card according to another embodiment of the present invention includes an affiliate POS terminal 200 configured to receive user card information and transmit a transaction approval request signal, and a mobile authentication server 420 configured to receive the transaction approval request signal, transmit a transaction authentication request signal to a portable user terminal 500, and transmit approval request information to a financial institution server 400 when transaction authentication is completed from an input signal of the portable user terminal 500.

A user card 120 is a general credit card, and the affiliate POS terminal 200 transmits credit card information received from the credit card 120 and a transaction approval request signal including corresponding transaction information including price information, installment information, and affiliate information to a VAN server 310.

The VAN server 310 receives the transaction approval request signal from the affiliate POS terminal 200 and transmits a corresponding approval request to the financial institution server 400. The financial institution server 400 extracts a phone number of a portable user terminal matching the credit card information from a previously acquired database and transmits an authentication request command signal for a corresponding transaction to the mobile authentication server 420.

The mobile authentication server 420 transmits the credit card information and the corresponding transaction information to the phone number of the portable user terminal according to the authentication request command signal to request transaction authentication, and transmits approval request information including password (PIN) information received from the portable user terminal 500 to the financial institution server 400.

The mobile authentication server 420 is a server that performs mobile authentication using card information of a plastic credit card and is operated by a card company, an agency company entrusted by the card company, or a financial institution.

That is, since the affiliate POS terminal of the system for providing a payment service that uses a credit card according to an embodiment of the present invention transmits only credit card information and corresponding transaction information without directly receiving a portable phone number from a user, it is possible to prevent a portable phone number corresponding to personal information of the user from being leaked.

Also, since the portable user terminal 500 of the system for providing a payment service that uses a credit card according to an embodiment of the present invention receives credit card information of a user and corresponding transaction information for a payment attempt that uses credit card information and performs corresponding transaction authentication, it is possible to prevent illegal use of a credit card by a third party.

This method is applied to a financial service card such as a bank debit card, a check card, a prepaid card, and a gift card in addition to a credit card.

That is, the system for providing a payment service according to an embodiment of the present invention receives information regarding a financial service card, such as a bank debit card, a check card, a prepaid card, and a gift card of a user who requests transaction authentication, and corresponding transaction information for a payment attempt that uses such a financial service card and performs corresponding transaction authentication.

Figure 4:
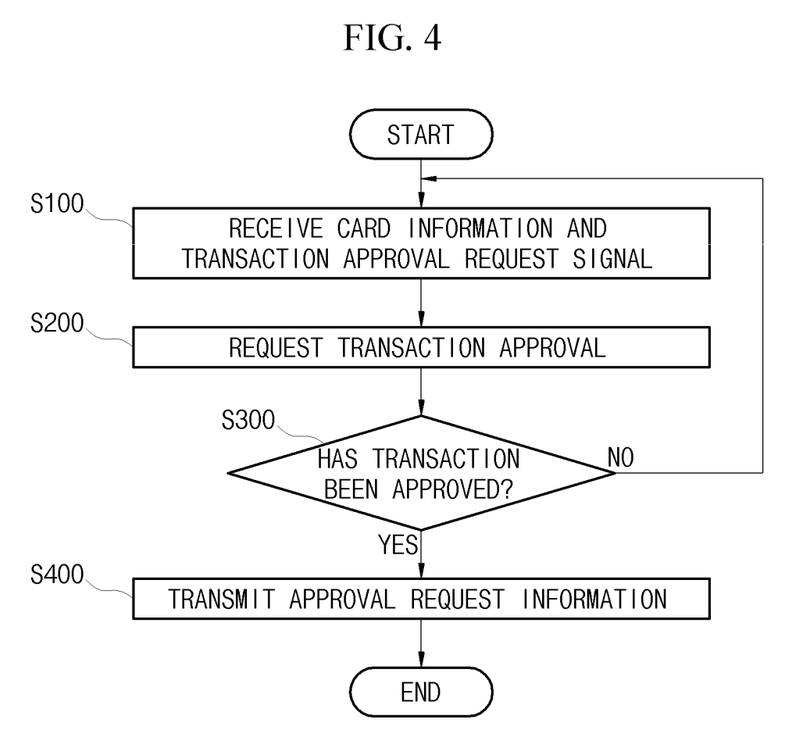
FIG. 4 is a flowchart showing a method of providing a payment service according to an embodiment of the present invention.

FIG. 4 is a flowchart showing a method of providing a payment service according to an embodiment of the present invention.

A method of providing a payment service according to an embodiment of the present invention includes receiving a transaction approval request signal including MIN card information of a user and corresponding transaction information (S100), transmitting a transaction authentication request signal corresponding to the received transaction approval request signal (S200), determining whether a transaction is authenticated (S300), and generating approval request information from a user input signal when the transaction is authenticated and transmitting the approval request information (S400).

In S100, an affiliate POS terminal receives MIN card information of a user that is recognized by reading a MIN card, which is a real plastic card, or recognized from a portable user terminal by using a coil loop method.

Also, the MIN card information of the user is portable user terminal number information or a personal identification card number. The personal identification card number corresponds to parameter information for matching and searching when the portable user terminal number information is not included in the MIN card information.

As an example, when a transaction approval request signal including portable user terminal number information that is acquired from a MIN card and corresponding transaction information that includes price information, installment information, and affiliate information are received in S100 and payment instrument information regarding the corresponding transaction information and password information regarding a corresponding payment instrument are input in 5300, approval request information is generated and transmitted by using the payment instrument information and the password information in 5400.

As another example, when a transaction approval request signal including credit card information is received by reading a credit card in S100, a transaction authentication request signal including the credit card information and corresponding transaction information is transmitted in 5200, and approval request information including password information of a credit card acquired in response to the transaction authentication request signal is generated and transmitted.

Figure 5A:
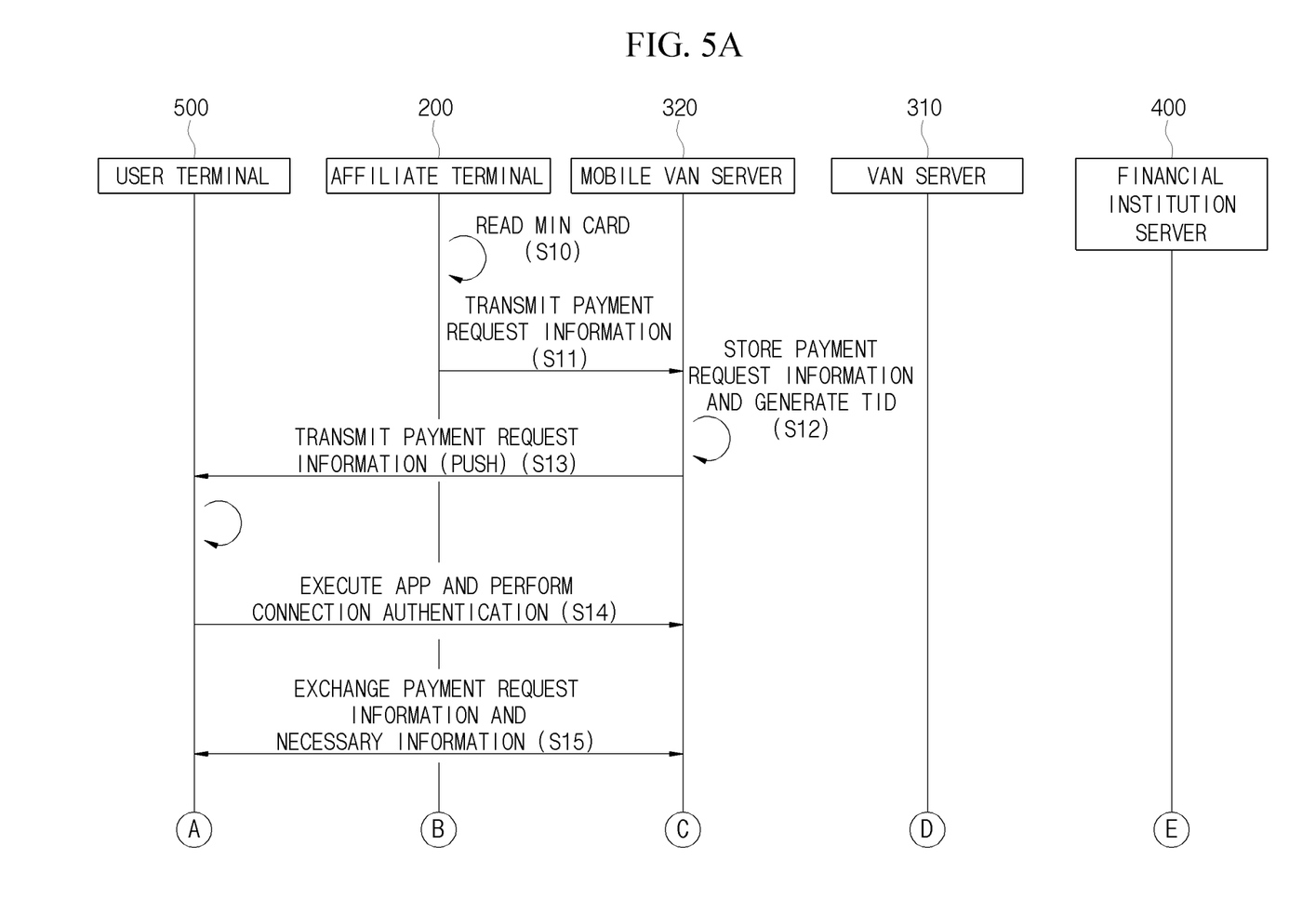
FIGS. 5A and 5B are sequence diagrams showing a sequence of a method of providing a payment service that uses a MIN card according to an embodiment of the present invention.
Figure 5B:
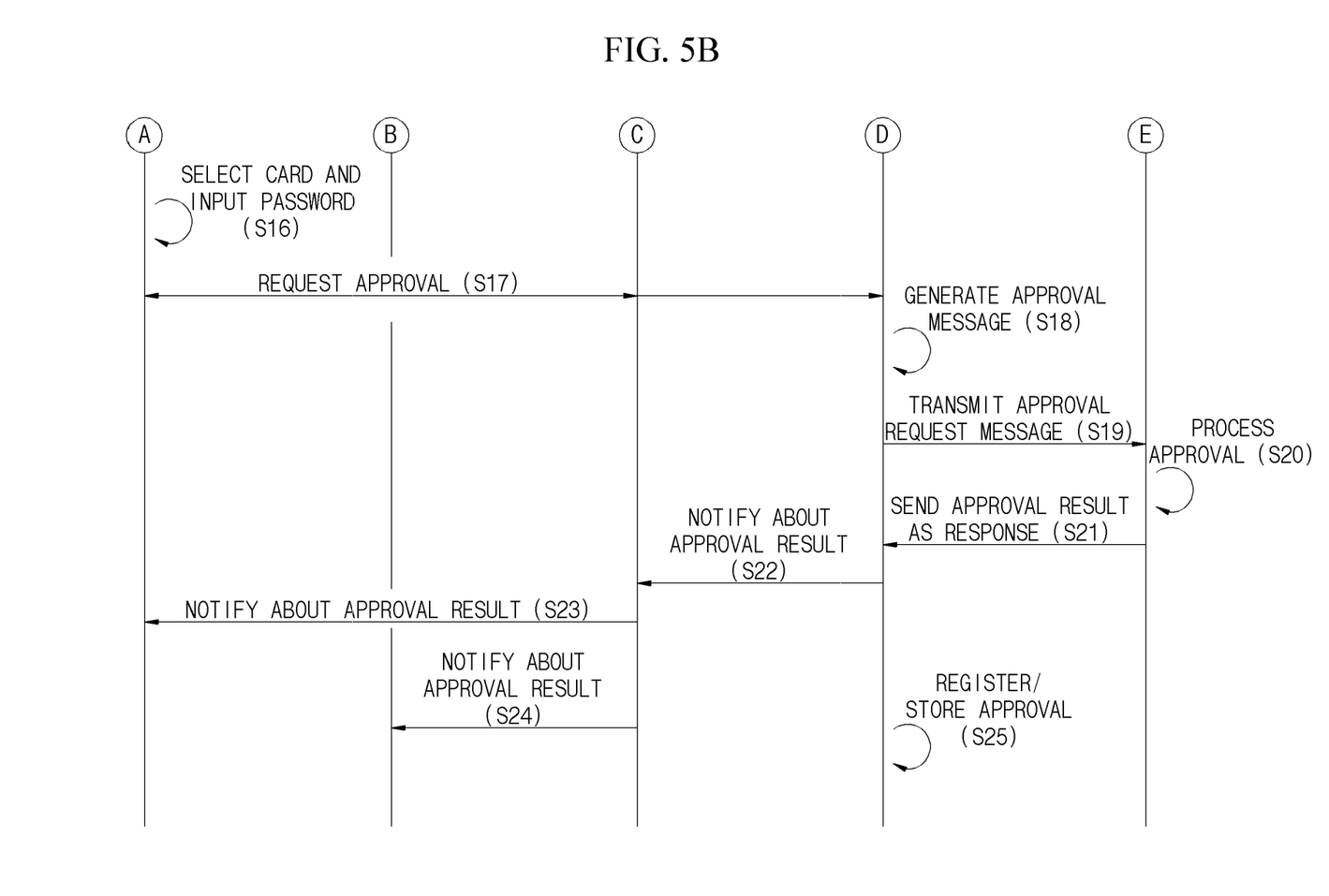

FIGS. 5A and 5B are sequence diagrams showing a sequence of a method of providing a payment service that uses a MIN card according to an embodiment of the present invention.

The affiliate POS terminal 200 reads MIN card information (a phone number of a portable user terminal or a personal identification card number) transferred from a user (S10) and transmits payment request information for corresponding transaction information (S11).

A method of reading a MIN card, which is a real plastic card, or a method of using a coil loop is used as the reading method in S10.

According to the coil loop method, the portable user terminal 500 converts MIN card information that is pre-stored into a magnetic field and transmits the magnetic field, and a magnetic reading unit of the affiliate POS terminal 200 receives the MIN card information by receiving the magnetic field.

When the payment request information is received, the mobile VAN server 320 stores the payment request information and generates a transaction ID (TID) (S12) and transmits the payment request information to a phone number of the portable user terminal 500 in the form of a push notification (S13).

When the above-described personal identification card number is input as the MIN card information, the mobile VAN server 320 matches the personal identification card number with a DB that is prestored in a server or an authentication server, searches for a portable phone number of a corresponding user, and transmits the payment request information to the phone number of the user terminal 500.

The user terminal 500 executes a payment app and inputs an ID and a password to perform connection authentication (S14) and exchanges the payment request information and necessary information with the mobile VAN server 320 (S15).

That is, the user terminal 500 receives information on a payment instrument (a credit card, a debit card, and a mobile phone for a small payment) for the corresponding transaction information and receives a password for the payment instrument (S16), and transmits a corresponding approval request to the VAN server 310 through the mobile VAN server 320 (S17).

The VAN server 310 generates an approval message for the approval request (S18), and transmits the approval message to the financial institution server 400 (S19).

When the transaction has been approved by the financial institution server 400 (S20), the VAN server 310 receives the approval result from the financial institution server 400 (S21), notifies the mobile VAN server 320, the user terminal 500, and the affiliate terminal 200 of the approval result (S22, S23, and S24), and registers and stores the approval result in a VAN server database (S25).

The present invention has been described above with respect to embodiments thereof. Those skilled in the art should understand that various changes in form and details may be made therein without departing from the spirit and scope of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being included in the present invention.

The invention claimed is:

1. A system for providing a payment service, the system comprising:
    an affiliate Point of Sales (POS) terminal configured to receive Mobile Identification Number (MIN) card information by reading an MIN card, which is a physical card, generate a transaction approval request signal comprising the MIN card information, the MIN card information comprising a personal identification card number, and transmit the generated transaction approval request signal; and
    a server configured to receive the transaction approval request signal, obtain a phone number of a portable user terminal by using information corresponding to the personal identification card number of the MIN card information, transmit a transaction authentication request signal to the portable user terminal by using the phone number of the portable user terminal, and transmit approval request information to a financial institution server when transaction authentication is completed based on an input signal of the portable user terminal,
    wherein the phone number of the portable user terminal and information on a payment instrument are not exposed to the affiliate POS terminal, and
    wherein the server is further configured to, upon completion of the transaction authentication based on the input signal of the portable user terminal, receive, from the portable user terminal, information on a selection of the payment instrument and a password for the selected payment instrument, and transmit the approval request information including the selected payment instrument and the password to the financial institution server.

2. The system of claim 1, wherein the affiliate POS terminal transmits the transaction approval request signal comprising the MIN card information and corresponding transaction information.

3. The system of claim 2, wherein the personal identification card number is a membership card number or an ID card number, which matches with the phone number of the portable user terminal, the phone number of the portable user terminal being not included in the MIN card information.

4. The system of claim 2, wherein the corresponding transaction information comprises price information, installment information, and affiliate information.

5. The system of claim 2, wherein the server comprises a VAN server configured to receive the transaction approval request signal and request corresponding transaction authentication, and a mobile VAN server configured to transmit the transaction authentication request signal comprising the corresponding transaction information to the portable user terminal in response to the request for the transaction authentication of the VAN server.

6. A method of providing a payment service, the method comprising:
    receiving Mobile Identification Number (MIN) card information of a user by reading a MIN card, which is a physical card, and receiving a transaction approval request signal comprising the MIN card information and corresponding transaction information from an affiliate Point of Sales (POS) terminal, the MIN card information comprising a personal identification card number;
    obtaining a phone number of a portable user terminal by using information corresponding to the personal identification card number of the MIN card information, transmitting a transaction authentication request signal corresponding to the received transaction approval request signal to the portable user terminal by using the phone number of the portable user terminal; and
    generating approval request information based on an input signal in response to the transaction authentication request signal and transmitting the generated approval request information,
    wherein the phone number of the portable user terminal and information on a payment instrument are not exposed to the affiliate POS terminal, and wherein the method further comprises, upon completion of the transaction authentication based on the input signal of the portable user terminal, receiving, from the portable user terminal, information on a selection of the payment instrument and a password for the selected payment instrument, and transmitting the approval request information including the selected payment instrument and the password to the financial institution server.

7. The method of claim 6, wherein the receiving the transaction approval request signal comprises receiving the transaction approval request signal comprising the MIN card information, which is portable user terminal number information or a personal identification number, and the corresponding transaction information comprising price information, installment information, and affiliate information.

8. The system of claim 1, wherein the MIN card is a real plastic card.

9. The method of claim 6, wherein the reading comprises reading the MIN card, which is a real plastic card.

* * * * *